(12) United States Patent
Lee et al.

(10) Patent No.: US 12,100,118 B2
(45) Date of Patent: Sep. 24, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Hyunseung Lee, Suwon-si (KR);
Donghyun Kim, Suwon-si (KR);
Youngsu Moon, Suwon-si (KR);
Seungho Park, Suwon-si (KR);
Younghoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 605 days.

(21) Appl. No.: 17/221,105

(22) Filed: Apr. 2, 2021

(65) Prior Publication Data
US 2022/0164923 A1    May 26, 2022

(30) Foreign Application Priority Data

Nov. 23, 2020    (KR) .................. 10-2020-0158173

(51) Int. Cl.
*G06T 3/4046*    (2024.01)
*G06F 18/21*    (2023.01)
(Continued)

(52) U.S. Cl.
CPC ........ *G06T 3/4046* (2013.01); *G06F 18/2163* (2023.01); *G06N 3/045* (2023.01); *G06N 3/08* (2013.01)

(58) Field of Classification Search
CPC ................. G06T 3/4046; G06T 3/4053; G06T 2207/20084; G06T 2207/20081;
(Continued)

(56) References Cited

U.S. PATENT DOCUMENTS 10,225,607 B1    3/2019    Bai et al.
10,360,482 B1    7/2019    Khara et al.
(Continued)

FOREIGN PATENT DOCUMENTS

KR    10-2018-0114488 A    10/2018
KR    10-2019-0097205 A    8/2019
(Continued)

OTHER PUBLICATIONS

Chen, Yuantao et al., "Image Super-Resolution Algorithm Based on Dual-Channel Convolutional Neural Networks", Applied Science, vol. 9, No. 11, Jun. 5, 2019. (17 pages total).
(Continued)

*Primary Examiner* — Ajibola A Akinyemi
(74) *Attorney, Agent, or Firm* — Sughrue Mion, PLLC

(57) ABSTRACT

An electronic apparatus is disclosed. The electronic apparatus includes a memory configured to store a plurality of neural network models, and a processor connected to the memory and control the electronic apparatus in which the processor is configured to obtain a weight map based on an object area included in an input image, and obtain a plurality of images by inputting the input image to each of the plurality of neural network models, and obtain an output image by weighting the plurality of images based on the weight map, and each of the plurality of neural network models is a model trained to upscale an image.

18 Claims, 9 Drawing Sheets

(51) Int. Cl.
  *G06N 3/045* (2023.01)
  *G06N 3/08* (2023.01)
(58) Field of Classification Search
  CPC ......... G06T 5/002; G06T 1/20; G06T 3/4076;
  G06T 5/50; G06T 11/40; G06T
  2207/20016; G06T 3/4007; G06T 15/503;
  G06T 2207/20221; G06T 3/0093; G06T
  9/002
  USPC ........................................................ 382/100
  See application file for complete search history.

(56) References Cited

U.S. PATENT DOCUMENTS

| | | |
|---|---|---|
| 10,430,683 B2 | 10/2019 | Liu et al. |
| 10,489,887 B2 | 11/2019 | El-Khamy et al. |
| 10,776,982 B2 | 9/2020 | Risser |
| 10,970,820 B2 | 4/2021 | El-Khamy et al. |
| 11,361,403 B2 | 7/2022 | Kalchbrenner et al. |
| 2017/0256033 A1 | 9/2017 | Tuzel et al. |
| 2018/0293707 A1 | 10/2018 | El-Khamy et al. |
| 2019/0087725 A1* | 3/2019 | Yang .................. G06N 3/08 |
| 2019/0114742 A1* | 4/2019 | Wang .................. G06T 5/60 |
| 2019/0278990 A1 | 9/2019 | Mansour et al. |
| 2019/0340462 A1 | 11/2019 | Pao et al. |
| 2020/0034948 A1 | 1/2020 | Park et al. |
| 2020/0090305 A1 | 3/2020 | El-Khamy et al. |
| 2020/0134787 A1 | 4/2020 | Bouzaraa et al. |
| 2020/0193227 A1 | 6/2020 | Zhou et al. |
| 2021/0027425 A1 | 1/2021 | Kalchbrenner et al. |
| 2021/0097646 A1 | 4/2021 | Choi et al. |
| 2021/0224953 A1 | 7/2021 | El-Khamy et al. |
| 2022/0284546 A1 | 9/2022 | Kalchbrenner et al. |

FOREIGN PATENT DOCUMENTS

| | | |
|---|---|---|
| KR | 10-2019-0117416 A | 10/2019 |
| KR | 10-2020-0015095 A | 2/2020 |
| KR | 10-2130073 B1 | 7/2020 |

OTHER PUBLICATIONS

International Search Report (PCT/ISA/210) issued Aug. 12, 2021 by the International Searching Authority in counterpart International Patent Application No. PCT/KR2021/003937.

Written Opinion (PCT/ISA/237) issued Aug. 12, 2021 by the International Searching Authority in counterpart International Patent Application No. PCT/KR2021/003937.

Communication issued Oct. 28, 2021 by the European patent Office in counterpart European Patent Application No. 21171724.4.

Ren, Haoyu et al., "Image Super Resolution Based on Fusing Multiple Convolution Neural Networks", 2017 IEEE Conference on Computer Vision and Pattern Recognition Workshops, Jul. 21, 2017, pp. 1050-1057, XP033145884. (8 pages total).

Vo, Dung T. et al., "Filter-Bank Based Super-Resolution for Rotated and Blurry Undersampled Images", Signals, Systems and Computers, Oct. 2006, pp. 1919-1923, XP031081365. (5 pages total).

Li, Xiangyang et al., "Heterogeneous Convolutional Neural Networks for Visual Recognition", Springer International Publishing AG, Sep. 2016, pp. 262-274. (13 pages total).

Wang, Xintao et al., "Recovering Realistic Texture in Image Super-resolution by Deep Spatial Feature Transform", IEEE, CVPR 2018, pp. 606-615. (10 pages total).

Communication dated Mar. 14, 2024, issued by the European Patent Office in European Application No. 21171724.4.

* cited by examiner

ELECTRONIC APPARATUS AND CONTROLLING METHOD THEREOF

CROSS-REFERENCE TO RELATED APPLICATIONS

This application claims priority from Korean Patent Application No. 10-2020-0158713, filed on Nov. 23, 2020 in the Korean Intellectual Property Office, the disclosure of which is incorporated herein by reference in its entirety.

BACKGROUND

1. Field

The disclosure relates to an electronic apparatus and a method for controlling the same. More particularly, the disclosure relates to an electronic apparatus for processing an image and a method for controlling the same.

In addition, the disclosure relates to an artificial intelligence (AI) system that simulates functions such as cognition, determination, etc. of human brain by using a machine learning algorithm, and its application.

2. Description of the Related Art

The AI system is a computer system that realizes human-level intelligence, and a machine learns and determines itself, and its recognition rate increases as it is used.

The AI technology consists of machine learning (deep learning) technology that uses an algorithm that classifies/learns features of input data by itself, and element technologies that simulate the functions of human brain's cognition, determination, etc. by using machine learning algorithms.

Element technologies may include, for example, linguistic understanding technology that recognizes human language/text, visual understanding technology that recognizes objects like human vision, reasoning/predicting technology that logically reasons and predicts by identifying information, knowledge expression technology that processes human experience information as knowledge data, and motion control technology that controls a movement of robots.

Recently, various types of learning-based upscaling methods are being actively developed with the development of deep learning technology.

The learning-based upscaling method may transform and upscale a low-definition low-resolution image into a high-definition, high-resolution image by using a large-capacity high-complexity network whose parameter value (weight value) is determined through learning. The network used herein may be designed in various structures, and may be implemented in various ways by adjusting a depth of the network, the number of parameters, or the like. In general, the more complex the network, the higher the performance may be secured.

For network learning, low-resolution and high-resolution images are used as inputs and outputs of the network, respectively. Here, both the input and output of the networks are configured in a single pass, and output one image with respect to one image.

This method shows superior image restoration performance compared to conventional signal processing or interpolation-based upscaling (Bicubic, Bilinear, Lanczos).

However, the network of single input and single output has a problem in that characteristics of various objects cannot be considered in the restoration process. For example, various objects may include people, text, graphic objects, artificial objects (buildings, sculptures, automobiles), natural objects (animals, plants), or the like, and have distinct characteristics. For example, text or graphic objects have a sharp outline and strong connection, a human face has a smooth outline, and face components such as eyes, nose, and mouth are contrasted, and natural objects are made of materials with strong noise characteristics (stochastic).

These various characteristics by objects are difficult to learn through the learning of one network, and even if the learning data is composed in a complex manner, there is a problem that individual characteristics of the object are not reflected in the learning process of the network. Eventually, learning for minimizing a total error may be performed, and one network may output an average quality of a target image.

FIG. 1 shows a spatial feature transform GAN (SFTGAN) structure as a related technique for solving this problem.

SFTGAN is a structure capable of transforming an intermediate result value of a network according to a condition representing object information of an input image. In the learning process, SFTGAN uses not only low/high quality images but also state information of an area such that the network may operate adaptively according to a local area.

SFTGAN shows excellent performance when an accuracy of state information is guaranteed. However, since the state information implicitly affects an intermediate result of the network, an output of condition network (lower left network) must be connected to the entire network in parallel with inference network (upper network) in order to reproduce distinguished characteristics of each object. This connection does not take into account a limit of memory and minimum operations required for reproduction for each object, and requires a high-capacity network for proper operation since all objects must be processed in one network.

The method can be used in an environment such as a cloud system capable of massive calculation of non-real-time processing, but it is difficult to use in a limited environment such as a TV or mobile device.

Accordingly, there is a need to develop a method capable of processing images while considering characteristics of various objects and using a lightweight model that can be used in the environment where there are limited resources.

SUMMARY

The disclosure is to provide an electronic apparatus with improved processing performance while reducing a weight of a model for processing an image.

According to an embodiment of the disclosure, an electronic apparatus includes a memory configured to store a plurality of neural network models, and a processor connected to the memory and control the electronic apparatus, wherein the processor is configured to obtain a weight map based on an object area included in an input image, obtain a plurality of images by inputting the input image to each of the plurality of neural network models, and obtain an output image by weighting the plurality of images based on the weight map, and wherein each of the plurality of neural network models is a model trained to upscale an image.

The plurality of neural network models may include a first neural network model and a second neural network model, wherein the processor is configured to obtain a first image by inputting the input image to the first neural network model, obtain a second image by inputting the input image to the second neural network model, based on the weight map, obtain the output image by weighting the first image and the second image, wherein the first neural network model is a model in which upscaling processing of the object area is enhanced, and wherein the second neural network model is a model in which upscaling processing of a background area included in the input image is enhanced.

The processor may be configured to assign a higher value to an object area included in the first image than an object area included in the second image, and assign a lower value to a background area included in the first image than a background area included in the second image to weight the first image and the second image.

The processor may be configured to identify the object area from the input image, and obtain a map in which a weight corresponding to the object area is different from a weight corresponding to the other area included in the input image.

The processor may be configured to obtain a weight map in which a weight gradually changes based on a center of the object area.

The processor may be configured to, based on a resolution of the input image being a critical resolution, input the input image to each of first models corresponding to the critical resolution among the plurality of neural network models, and based on the resolution of the input image being higher than the critical resolution, preprocess the input image, and input the preprocessed image to each of second models among the plurality of neural network models.

The processor may be configured to, based on the resolution of the input image being higher than the critical resolution, divide the input image into a plurality of sub-images by shuffling, and input the plurality of sub-images into each of the second models.

The processor may be configured to, based on a resolution of the input image being a critical resolution, input the input image to each of first models corresponding to the critical resolution among the plurality of neural network models, and based on the resolution of the input image being higher than the critical resolution, change the input image to an image having the critical resolution by sampling the input image, and input the changed image having the critical resolution to each of the first models.

The object area may be configured to include at least one of a human body area, a face area, a text area, a graphic area, an artifact area, and a natural object area.

The plurality of neural network models include a first neural network model and a second neural network model, and the processor may be configured to obtain a first image and a second image by inputting the input image to the first neural network model, obtain a third image by inputting the input image to the second neural network model, based on the weight map, obtain the output image by weighting the first image, the second image, and the third image, wherein the first neural network model is a model in which upscaling processing of a first type of an object area included in the input image and corresponding to the first image and upscaling processing of a second type of an object area included in the input image area corresponding to the second image are enhanced, wherein the second neural network model is a model in which upscaling processing of a third type of an object area included in the input image and corresponding to the third image is enhanced, and wherein the first type, the second type and the third type are different from each other.

According to an embodiment of the disclosure, a method of controlling an electronic apparatus includes obtaining a weight map based on an object area included in an input image, obtaining a plurality of images by inputting the input image to each of a plurality of neural network models, and obtaining an output image by weighting the plurality of images based on the weight map, wherein each of the plurality of neural network models is a model trained to upscale an image.

The plurality of neural network models may include a first neural network model and a second neural network model, wherein the obtaining the plurality of images includes obtaining a first image by inputting the input image to the first neural network model, and obtaining a second image by inputting the input image to the second neural network model, wherein the obtaining the output image includes, based on the weight map, obtaining the output image by weighting the first image and the second image, wherein the first neural network model is a model in which upscaling processing of the object area is enhanced, and wherein the second neural network model is a model in which upscaling processing of a background area included in the input image is enhanced.

The obtaining the output image may include assigning a higher value to an object area included in the first image than an object area included in the second image, and assigning a lower value to a background area included in the first image than a background area included in the second image to weight the first image and the second image.

The obtaining the weight map may include identifying the object area from the input image, and obtaining a map in which a weight corresponding to the object area is different from a weight corresponding to the other area included in the input image.

The obtaining the weight map may include obtaining a weight map in which a weight gradually changes based on a center of the object area.

The obtaining the plurality of images may include, based on a resolution of the input image being a critical resolution, inputting the input image to each of first models corresponding to the critical resolution among the plurality of neural network models, and based on the resolution of the input image being higher than the critical resolution, preprocessing the input image, and inputting the preprocessed image to each of second models among the plurality of neural network models.

The inputting the preprocessed image to each of the second models may include, based on the resolution of the input image being higher than the critical resolution, dividing the input image into a plurality of sub-images by shuffling, and inputting the plurality of sub-images into each of the second models.

The obtaining the plurality of images may include, based on a resolution of the input image being a critical resolution, inputting the input image to each of first models corresponding to the critical resolution among the plurality of neural network models, and based on the resolution of the input image being higher than the critical resolution, changing the input image to an image having the critical resolution by sampling the input image, and inputting the changed image having the critical resolution to each of the first models.

The object area may be configured to include at least one of a human body area, a face area, a text area, a graphic area, an artifact area, and a natural object area.

According to an embodiment of the disclosure, a non-transitory computer-readable recording medium in which a program for executing a method of operating an electronic apparatus is stored, wherein the method includes obtaining a weight map based on an object area included in an input image, obtaining a plurality of images by inputting the input image to each of a plurality of neural network models, and obtaining an output image by weighting the plurality of images based on the weight map, wherein each of the plurality of neural network models is a model trained to upscale an image.

According to the various embodiments of the disclosure as described above, the electronic apparatus may improve image processing performance by using a plurality of neural network models specialized for each object type.

In addition, the plurality of neural network models are specialized for each type of object, such that weight reduction is possible, thereby reducing a capacity of the model.

DETAILED DESCRIPTION

Figure 1:
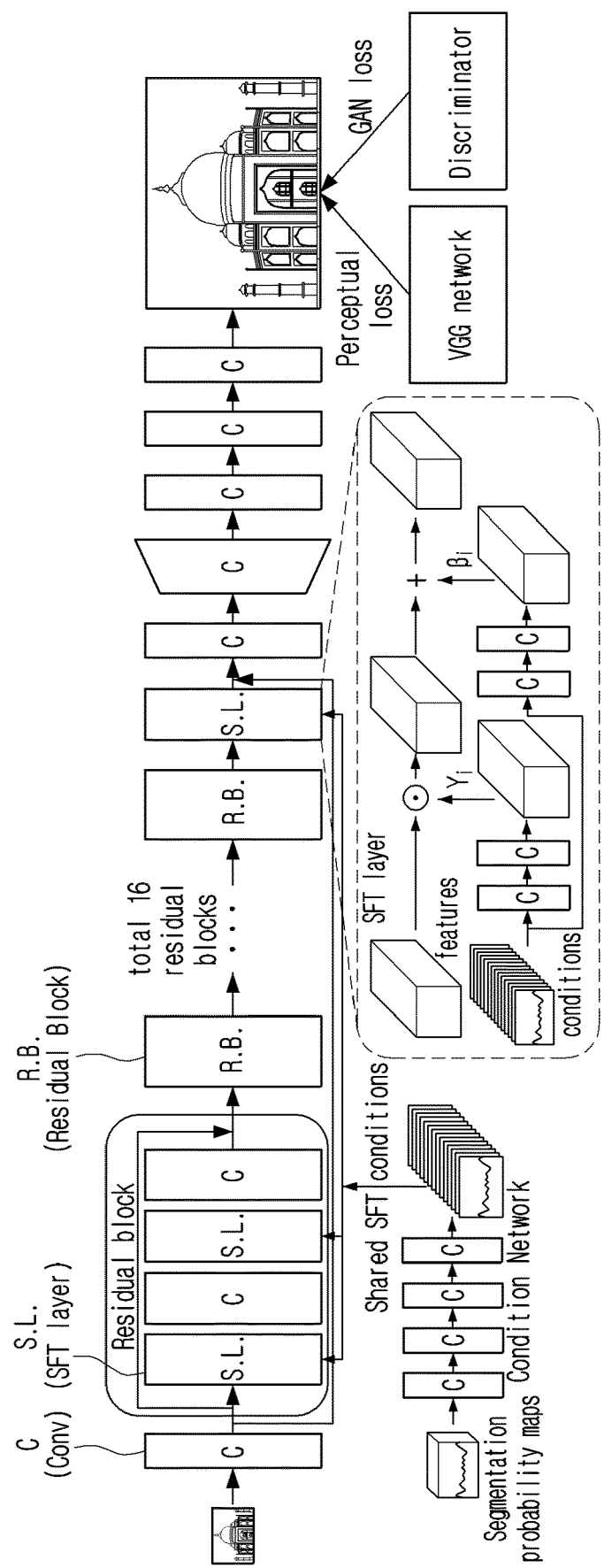
FIG. 1 is a view illustrating a related art.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, the disclosure will be described in detail with reference to the accompanying drawings.

The terms used in the present disclosure are selected as general terminologies currently widely used in consideration of the configuration and functions of the present disclosure, but can be different depending on the intention of those skilled in the art, a precedent, appearance of new technologies, or the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure The terms "have", "may have", "include", and "may include" used in the exemplary embodiments of the present disclosure indicate the presence of corresponding features (for example, elements such as numerical values, functions, operations, or parts), and do not preclude the presence of additional features.

The term "at least one of A or/and B" means including at least one A, including at least one B, or including both at least one A and at least one B.

The term such as "first" and "second" used in various exemplary embodiments may modify various elements regardless of an order and/or importance of the corresponding elements, and does not limit the corresponding elements.

Singular forms are intended to include plural forms unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the disclosure, the term "user" may refer to a person using an electronic apparatus or a device (e.g., an artificial intelligence electronic apparatus) using an electronic apparatus.

Hereinafter, various embodiments of the disclosure will be described in more detail with reference to the accompanying drawings.

Figure 2A:
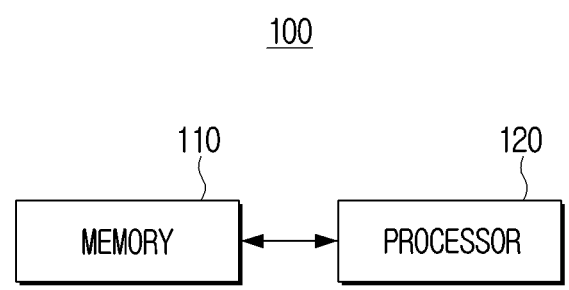
FIG. 2A is a block diagram illustrating a configuration of an electronic apparatus according to an embodiment of the disclosure.

FIG. 2A is a block diagram illustrating a configuration of an electronic apparatus 100 according to an embodiment of the disclosure.

The electronic apparatus 100 is a device that processes an input image, and includes a TV, a desktop PC, a laptop computer, a video wall, a large format display (LFD), a digital signage, digital information display (DID), a projector display, a digital video disk (DVD) player, a smart phone, a tablet PC, a monitor, smart glasses, a smart watch, or the like, and may be a device that directly displays acquired graphic image. Alternatively, the electronic apparatus 100 may be a device that does not have a display such as a set-top box (STB), a speaker, a computer body, etc., and may be a device that provides acquired graphic image to the display device. However, the disclosure is not limited thereto, and the electronic apparatus 100 may be any device as long as it can process an input image.

The electronic apparatus 100 includes a memory 110 and a processor 120, as shown in FIG. 2A.

The memory 110 may refer to hardware that stores information such as data in an electrical or magnetic form such that the processor 120 or the like can access it. For this operation, the memory 110 may be implemented as at least one of a non-volatile memory, a volatile memory, a flash memory, a hard disk drive (HDD) or a solid-state drive (SSD), RAM, and ROM.

At least one instruction or module required for the operation of the electronic apparatus 100 or the processor 120 may be stored in the memory 110. The instruction is a unit of code indicating the operation of the electronic apparatus 100 or the processor 120, and may be provided in machine language, which is a language understandable by a computer. The module may be a set of instructions that perform a specific task in a unit of work.

The memory 110 may store data, which is information in units of bits or bytes capable of representing texts, numbers, images, or the like. For example, a plurality of neural network models may be stored in the memory 110. Each of the plurality of neural network models may be a model trained to upscale an image. However, the disclosure is not limited thereto, and each of the plurality of neural network models may be a model for removing noise, and any model used to process the image may be used.

The memory 110 may be accessed by the processor 120, and readout/record/modify/delete/update for instructions, modules, or data by the processor 120 may be performed.

The processor 120 controls the overall operation of the electronic apparatus 100. Specifically, the processor 120 may be connected to each component of the electronic apparatus 100 to control the overall operation of the electronic apparatus 100. For example, the processor 120 may be connected to a component such as the memory 110 to control the operation of the electronic apparatus 100.

According to an embodiment, the processor 120 may be implemented as a digital signal processor (DSP), a microprocessor, or a time controller (TCON), but is not limited thereto, and may include one or more of a central processing unit (CPU), microcontroller unit (MCU), micro processing unit (MPU), controller, application processor (AP), or communication processor (CP), ARM processor, or may be defined with a corresponding term. In addition, the processor 120 may be implemented as a system on chip (SoC) or large-scale integration (LSI) with a built-in processing algorithm, or may be implemented in the form of field programmable gate array (FPGA).

The processor 120 may acquire a weight map based on an object area included in an input image. The processor 120 may identify the object area from the input image and acquire a weight map in which a weight corresponding to the object area is different from a weight corresponding to the other area in the input image. For example, the processor 120 may identify a predetermined object area such as a face area, or the like in the input image, and generate a weight map to distinguish the identified object area from other areas.

The processor 120 may acquire a weight map in which the weight is gradually changed based on a center of the object area. For example, the weight map may be the same as a size of the input image, the object area may be expressed in white in the weight map, and the further away from the center of the object area, the darker color may be expressed. The object area may include at least one of a human body area, a face area, a text area, a graphic area, an artificial object area, and a natural object area.

However, the disclosure is not limited thereto, and the processor 120 may acquire the weight map in any number of various forms. Alternatively, the processor 120 may acquire a coordinate value representing the object area instead of the weight map, and any method may be used as long as it is a method capable of indicating a location of the object area. Also, the size of the weight map may be larger than a size of the input image. For example, the size of the weight map may be the same as a size of an upscaled image of the input image to be described below.

The processor 120 may acquire a weight map based on a plurality of types of object areas included in the input image. For example, the processor 120 may acquire a weight map based on the face area and the text area included in the input image. In this case, the face area may be expressed in white, the text area may be expressed in red, and the background area may be expressed in black.

The processor 120 may acquire a plurality of images by inputting the input image to each of the plurality of neural network models, and acquire an output image by weighting the plurality of images based on the weight map.

For example, the plurality of neural network models may include a first neural network model and a second neural network model, and the processor 120 may acquire a first image by inputting the input image to the first neural network model, acquire a second image by inputting the input image to the second neural network mode, and acquire an output image by weighting the first image and the second image based on the weight map. The first neural network model may be a model in which an upscaling process of the object area is enhanced, and the second neural network model may be a model in which the upscaling process of the background area is enhanced.

The output image may be an image in which the input image is upscaled, a weight of the first image processed by the first neural network model may be highly reflected in the object area, and a weight of the second image processed by the second neural network model may be highly reflected in the background area.

In other words, the processor 120 may give the object area included in the first image a higher weight than the object area included in the second image, and the background area included in the first image a lower weight than the background area included in the second image to weight the first image and the second image. A boundary between the object area and the background area may have the same weight. As the weights are reflected differently for each area, upscaling processing in which area characteristics are more reflected for each area may be possible.

In the above, it has been described that two neural network models are used, but the disclosure is not limited thereto. For example, the plurality of neural network models may include a first neural network model with enhanced upscaling processing of the face area, a second neural network model with enhanced upscaling processing of a text area, and a third neural network model with enhanced upscaling processing of an artifact area. The processor 120 may acquire three images by inputting the input image to each of the first neural network model to the third neural network model. In addition, the processor 120 may acquire an output image by weighting the three images using a weight map based on the face area, the text area, and the artifact area.

Meanwhile, if the resolution of the input image is a critical resolution, the processor 120 may input the input image to each of first models corresponding to the critical resolution among the plurality of neural network models, and if the resolution of the input image is greater than the critical resolution, the processor may preprocess the input image and input the preprocessed input image to each of second models among the plurality of neural network models.

For example, if the resolution of the input image is SD resolution, the processor 120 may input the input image to each of first models corresponding to the SD resolution among the plurality of neural network models, and if the resolution of the input image is greater than the SD resolution, the processor may preprocess the input image, and input the preprocessed image to each of the second models among the plurality of neural network models. The first models may be models trained based on sample images of SD resolution, and the second models may be models trained based on sample images equal to the resolution of the input image greater than the SD resolution.

If the resolution of the input image is greater than the critical resolution, the processor 120 may shuffle the input image to divide the input image into a plurality of sub-images, and input the plurality of sub-images to each of the second models. For example, if the input image has FHD resolution, the processor 120 may divide the input image into four channels based on a position of a pixel. For example, the processor 120 may divide a first pixel into a first channel, a second pixel to the right of the first pixel into a second channel, a third pixel below the first pixel into a third channel, and a fourth pixel to the right of the third pixel into a fourth channel, and the same method thereof may apply to the rest of the pixels to divide the input image into four channels. In other words, the processor 120 may perform preprocessing of dividing the input image into a plurality of channels.

Alternatively, if the resolution of the input image is the critical resolution, the processor 120 may input the input image to each of the first models corresponding to the critical resolution among the plurality of neural network models, and if the resolution of the input image is greater than the critical resolution, the processor 120 may sample the input image to change the input image to an image having the critical resolution, and the changed image having the critical resolution may be input to each of the first models.

For example, if the resolution of the input image is SD resolution, the processor 120 may input the input image to each of the first models corresponding to the SD resolution among the plurality of neural network models, and if the resolution of the input image is greater than the SD resolution, the processor may sample the input image to change the input image to an image having the SD resolution, input the changed image having the SD resolution to each of the first models.

As described above, the electronic apparatus 100 does not need to include a line memory (SRAM) for processing a high-resolution image, and may process a high-resolution image even if the apparatus includes a line memory for processing a low-resolution image. Also, as the electronic apparatus 100 includes a line memory for processing the low-resolution image, manufacturing cost may be reduced.

Figure 2B:
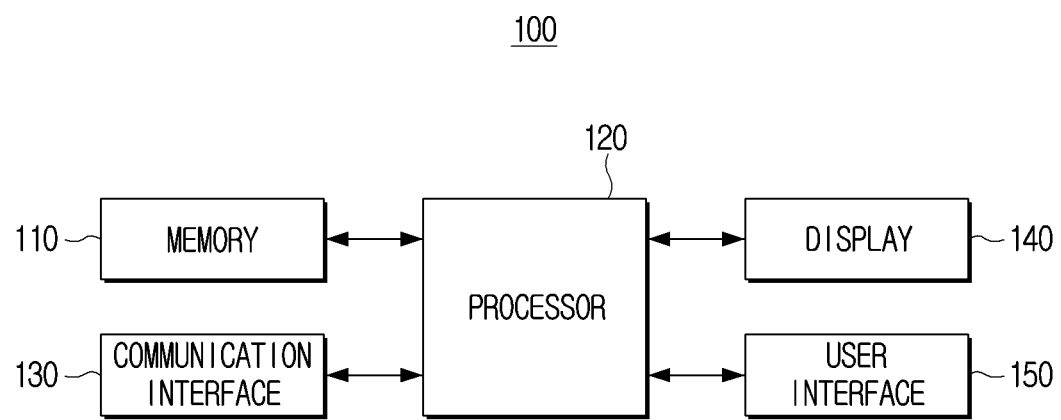
FIG. 2B is a block diagram illustrating a detailed configuration of an electronic apparatus according to an embodiment of the disclosure.

FIG. 2B is a block diagram illustrating a detailed configuration of an electronic apparatus 100 according to an embodiment of the disclosure. The electronic apparatus 100 may include a memory 110 and a processor 120. In addition, according to FIG. 2B, the electronic apparatus 100 may further include at least one of a communication interface 130, a display 140, and a user interface 150. Among the components shown in FIG. 2B, detailed descriptions of parts that overlap with the components shown in FIG. 2A will not be described.

The electronic apparatus 100 may be an apparatus without a display such as an STB, but may be implemented as an apparatus including the display 140 such as a TV. In this case, the electronic apparatus 100 may include the communication interface 130, the display 140, and the user interface 150 to receive an input image from the outside, and may process and display the input image according to a user command.

The communication interface 130 is a component that communicates with various types of external devices according to various types of communication methods. For example, the electronic apparatus 100 may receive an input image, a neural network model, or the like from an external device through the communication interface 130.

The communication interface 130 may include a Wi-Fi module, a Bluetooth module, an infrared communication module, a wireless communication module, or the like. Here, each communication module may be implemented in the form of at least one hardware chip.

The Wi-Fi module and the Bluetooth module communicate with each other in a Wi-Fi method and a Bluetooth method. When the Wi-Fi module or the Bluetooth module is used, various types of connection information, such as an SSID, a session key, or the like, may be transmitted and received first, and various types of information may be transmitted and received after a communication connection using the same. The infrared communication module performs communication according to an infrared data association (IrDA) technology, which wirelessly transmits data in a short distance using infrared rays between sight rays and millimeter waves.

In addition to the above-described communication methods, the wireless communication module may include at least one communication chip that performs communication according to various wireless communication standards such as ZigBee, 3rd generation (3G), 3rd generation partnership project (3GPP), long term evolution (LTE), LTE advanced (LTE-A), 4th generation (4G), 5th generation (5G), or the like.

Alternatively, the communication interface 130 may include a wired communication interface such as HDMI, DP, Thunderbolt, USB, RGB, D-SUB, DVI, or the like.

In addition, the communication interface 130 may include at least one of a local area Network (LAN) module, an Ethernet module, or a wired communication module for performing communication using a pair cable, a coaxial cable, an optical fiber cable, or the like.

The display 140 may be implemented as various types of displays such as a liquid crystal display (LCD), an organic light emitting diodes (OLED) display, a plasma display panel (PDP), or the like. In the display 140, a driving circuit, a backlight unit, or the like, which may be implemented in the form of an a-si TFT, a low temperature poly silicon (LTPS) TFT, an organic TFT (OTFT), or the like may also be included. Meanwhile, the display 140 may be implemented as a touch screen combined with a touch sensor, a flexible display, a 3D display, or the like.

The processor 120 may control the display 140 to display an output image. However, when the electronic apparatus 100 does not include the display 140, the processor 120 may control the communication interface 130 to transmit an output image to a device such as a TV.

The user interface 150 may be implemented as a button, a touch pad, a mouse, a keyboard, or the like, or may be implemented as a touch screen capable of performing the above-described display function and manipulation input function. The button may refer to various types of buttons such as a mechanical button, a touch pad, a wheel, etc. formed in an arbitrary area such as a front portion, a side portion, a rear portion, or the like of the exterior of body of the electronic apparatus 100.

Meanwhile, the electronic apparatus 100 may further include a microphone (not shown) and may receive a user voice through the microphone. The electronic apparatus 100 may digitize the user voice received through the microphone and perform a corresponding operation based on the digitized user voice. Alternatively, the electronic apparatus 100 may receive a user voice input by a separate device such as a remote-control device (not shown) from the corresponding device.

The remote-control device may be a device manufactured to control the electronic apparatus 100. However, the disclosure is not limited thereto, and the remote-control device may be a device in which an application for controlling the electronic apparatus 100 is installed in a device such as a smartphone.

In this case, the electronic apparatus 100 may include an IR receiver, and may receive a control signal from the remote-control device through the IR receiver. However, the disclosure is not limited thereto, and the electronic apparatus 100 may receive a control signal from the remote-control device through Bluetooth, Wi-Fi, etc., and any communication standard capable of receiving a control signal from the remote-control device may be used.

The remote-control device may include a microphone for receiving the user voice and a communicator for digitizing the received user voice and transmitting the digitized user voice to the electronic apparatus 100.

The processor 120 may directly identify the digitized user voice, but may transmit it to an external server such as an STT server and receive a corresponding control command from the external server.

Meanwhile, the functions related to artificial intelligence according to the disclosure are operated through the processor 120 and the memory 110.

The processor 120 may be composed of one or a plurality of processors. In this case, one or the plurality of processors may be a general-purpose processor such as a CPU, AP, DSP, or the like, a graphics dedicated processor such as a GPU or a vision processing unit (VPU), or an artificial intelligence dedicated processor such as an NPU.

One or more processors control to process input data according to a predefined operation rule or an artificial intelligence model stored in the memory 110. Alternatively, when one or more processors are artificial intelligence dedicated processors, the artificial intelligence dedicated processor may be designed with a hardware structure specialized for processing a specific artificial intelligence model. The predefined operation rule or the artificial intelligence model may be characterized by being generated through learning.

The feature of being generated though learning means that a basic artificial intelligence model is learned using a plurality of learning data by a learning algorithm, such that the predefined behavioral rule or artificial intelligence model set to perform a desired characteristic (or purpose) is generated. Such learning may be performed in the device itself performing artificial intelligence according to the disclosure, or may be performed through a separate server and/or system. Examples of the learning algorithm include supervised learning, unsupervised learning, semi-supervised learning, or reinforcement learning, but are not limited to the above-described examples.

The artificial intelligence model may be composed of a plurality of neural network layers. Each of the plurality of neural network layers may have a plurality of weight values, and perform a neural network computation through a computation between the calculation result of the previous layer and the plurality of weights values. The plurality of weight values of the plurality of neural network layers may be optimized by the learning result of the artificial intelligence model. For example, the plurality of weight values may be updated to reduce or minimize a loss value or a cost value acquired from the artificial intelligence model during the learning process.

The artificial neural network may include a deep neural network (DNN), for example, a convolutional neural network (CNN), a deep neural network (DNN), a recurrent neural network (RNN), a restricted Boltzmann machine (RBM), deep belief network (DBN), bidirectional recurrent deep neural network (BRDNN), generative adversarial network (GAN), or deep Q-networks, etc., but are not limited thereto.

As described above, as the electronic apparatus 100 uses a plurality of neural network models specialized for each object type, image processing performance may be improved.

Hereinafter, the operation of the electronic apparatus 100 will be described in more detail with reference to FIGS. 3 to 7. In FIGS. 3 to 7, individual embodiments are described for convenience of description. However, individual embodiments of FIGS. 3 to 7 may be implemented in any combination.

Figure 3:
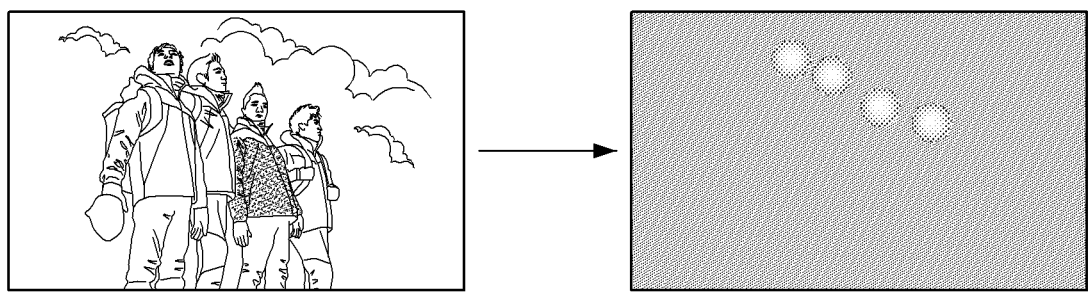
FIG. 3 is a view illustrating a method of acquiring a weight map according to an embodiment of the disclosure.

FIG. 3 is a view illustrating a method of acquiring a weight map according to an embodiment of the disclosure.

The processor 120 may acquire a weight map based on an object area included in an input image. Specifically, the processor 120 may identify the object area from the input image, and acquire a weight map in which a weight corresponding to the object area is different from a weight corresponding to the other area in the input image. Here, the object area may be an object area of a type selected by the user.

For example, as illustrated in FIG. 3, when a face area is selected as an object area, the processor 120 may identify the face area from the input image, and acquire a weight map in which a weight corresponding to the face area is different from the weight corresponding to the other area in the input image.

The weight map may be generated to distinguish a specific area from the rest of the areas. For example, as illustrated in FIG. 3, in the weight map, the face area may be expressed in white and the rest of the areas may be expressed in black. Also, the further away from the center of the face area, the color may change from white to black.

Meanwhile, the user may select a plurality of types of object areas. For example, when the user selects a face area and a text area, the processor 120 may identify the face area and the text area, and acquire a weight map such that the face area, the text area, and the rest of the areas are expressed differently.

Meanwhile, the processor 120 may acquire a weight map with a size corresponding to a resolution of the input image. For this operation, in the case of weighting a plurality of images output from each of the plurality of neural network models, the processor 120 may upscale the weight map to correspond to the sizes of the plurality of images.

Alternatively, in the step of acquiring the weight map, the processor 120 may upscale the weight map to correspond to the sizes of the plurality of images output from each of the plurality of neural network models.

Figure 4:
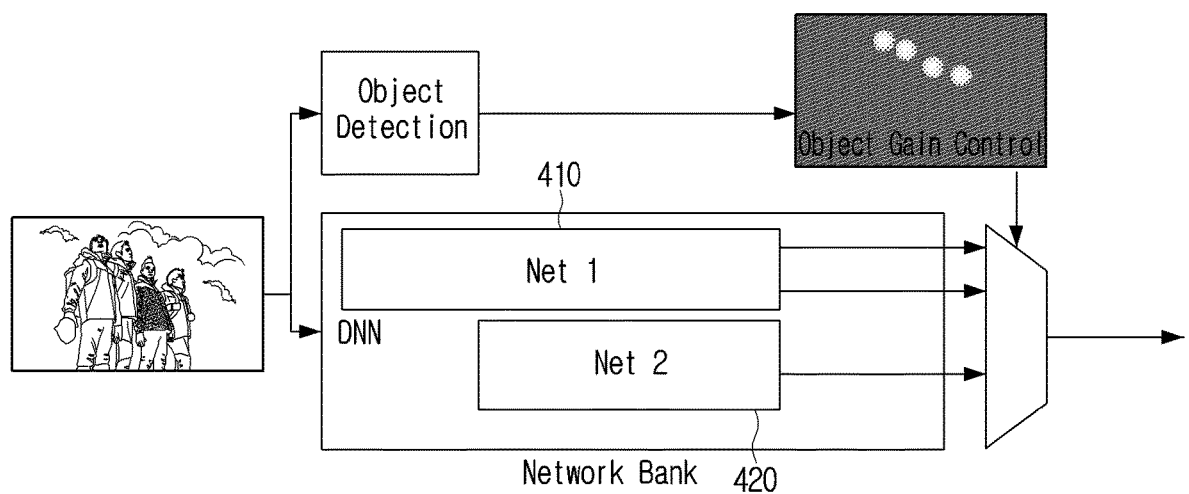
FIG. 4 is a view illustrating an operation of acquiring an output image according to an embodiment of the disclosure.

FIG. 4 is a view illustrating an operation of acquiring an output image according to an embodiment of the disclosure. The upper part of FIG. 4 shows an object identification operation and an object gain control operation, and a description overlapping with that of FIG. 3 will not be described.

A network bank including a first neural network model 410 and a second neural network model 420 may be stored in the memory 110. In FIG. 4, only two neural network models are shown for convenience of description, but the network bank may include any kinds of various neural network models.

The network bank may include a model in which processing of a specific type of object area is enhanced, such as the second neural network model 420. For example, the second neural network model 420 is a model in which processing of a natural object area is enhanced, and may be a model acquired by learning a sample image including a natural object and a low-resolution image of the sample image.

However, the disclosure is not limited thereto, and the network bank may include a model in which processing of a plurality of types of object areas is enhanced, such as the first neural network model 410. For example, the first neural network model 410 is a model in which a processing of the face area and a processing of the human body area are enhanced, and may be a model acquired by learning a sample image including the face area and the human body area, and a low-resolution image of the sample image. In this case, the first neural network model 410 may output both an image with enhanced processing of the face area and an image with enhanced processing of the human body area.

The processor 120 may input the input image to the first neural network model 410 and the second neural network model 420, respectively, acquire a first image and a second image from the first neural network model 410, and acquire a third image from the second neural network 420.

The processor 120 may acquire an output image by weighting the first image, the second image, and the third image based on the weight map.

The operation of weighting may be performed for each pixel. For example, when weighting an upper left pixel of the first image, the second image, and the third image, the processor 120 may use the upper left value of the weight map.

For convenience of description, when weighting the first image from the first neural network model 410 and the third image from the second neural network model 420, the processor 120 may acquire an output image based on the Equation 1 below.

$$Y=w\cdot Y1+(1-w)\cdot Y2 \quad [\text{Equation 1}]$$

Here, Y may be a pixel value of an output image, Y1 may be a pixel value of the first image, Y2 may be a pixel value of the third image, and w may be a weight value.

The processor 120 may acquire an output image by applying Equation 1 above to all pixel values.

Meanwhile, in the case of weighting the first image, the second image from the first neural network model 410 and the third image from the second neural network model 420, the processor 120 may apply a weight value based on an enhancement type of each image of the first to third images. For example, the processor 120 may apply a weight value of 0.9 to the face area when the first image is an image in which the face area is enhanced, apply a weight value of 0.1 to the face area when the second image is an image in which the body area is enhanced, and apply a weight value of 0 when the third image is an image in which the natural object area is enhanced.

In the above, a method of weighting a plurality of images has been described, but the disclosure is not limited thereto. For example, the processor 120 may acquire a weight map in an area unit of a predetermined size, not in a pixel unit, and weight the plurality of images based on the acquired weight map.

Figure 5:
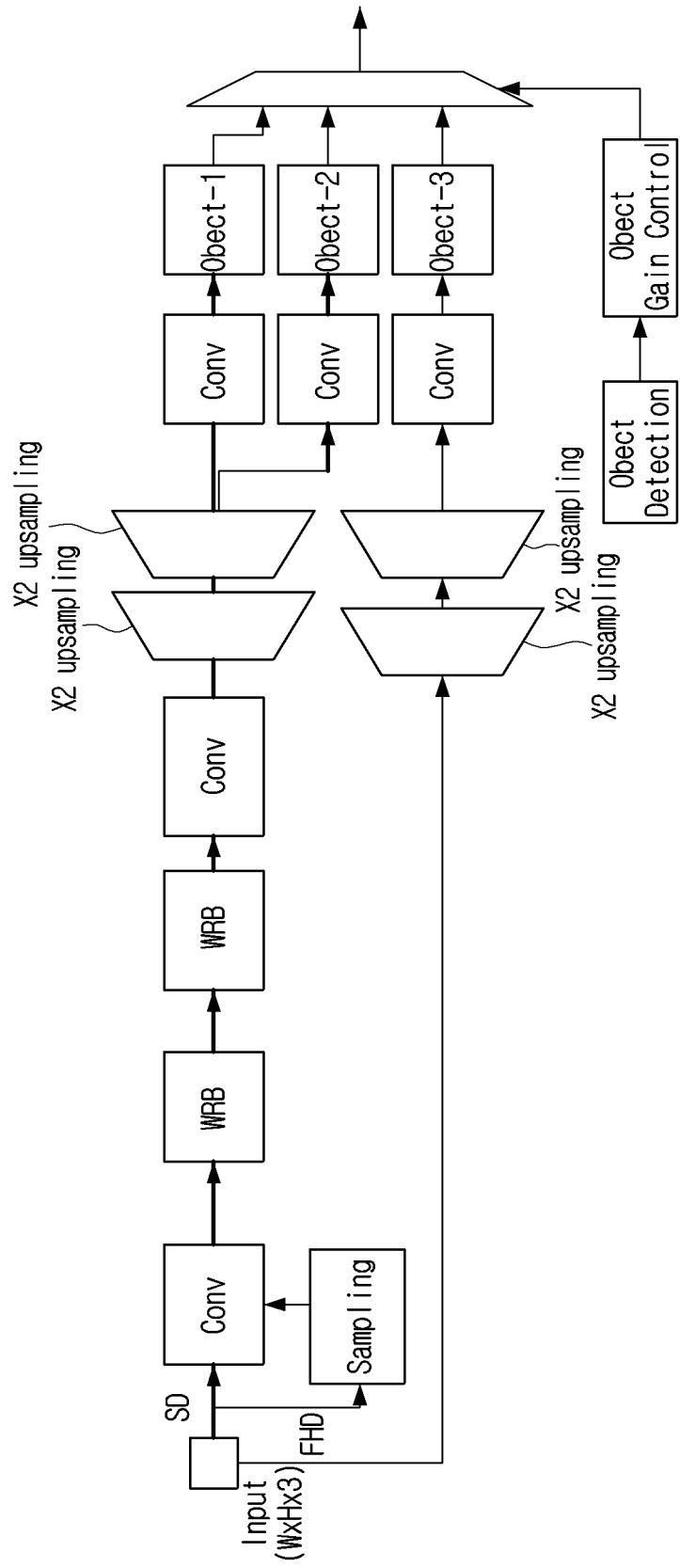
FIGS. 5 and 6 are views illustrating methods of reducing a capacity of a line memory according to various embodiments of the disclosure.
Figure 6:
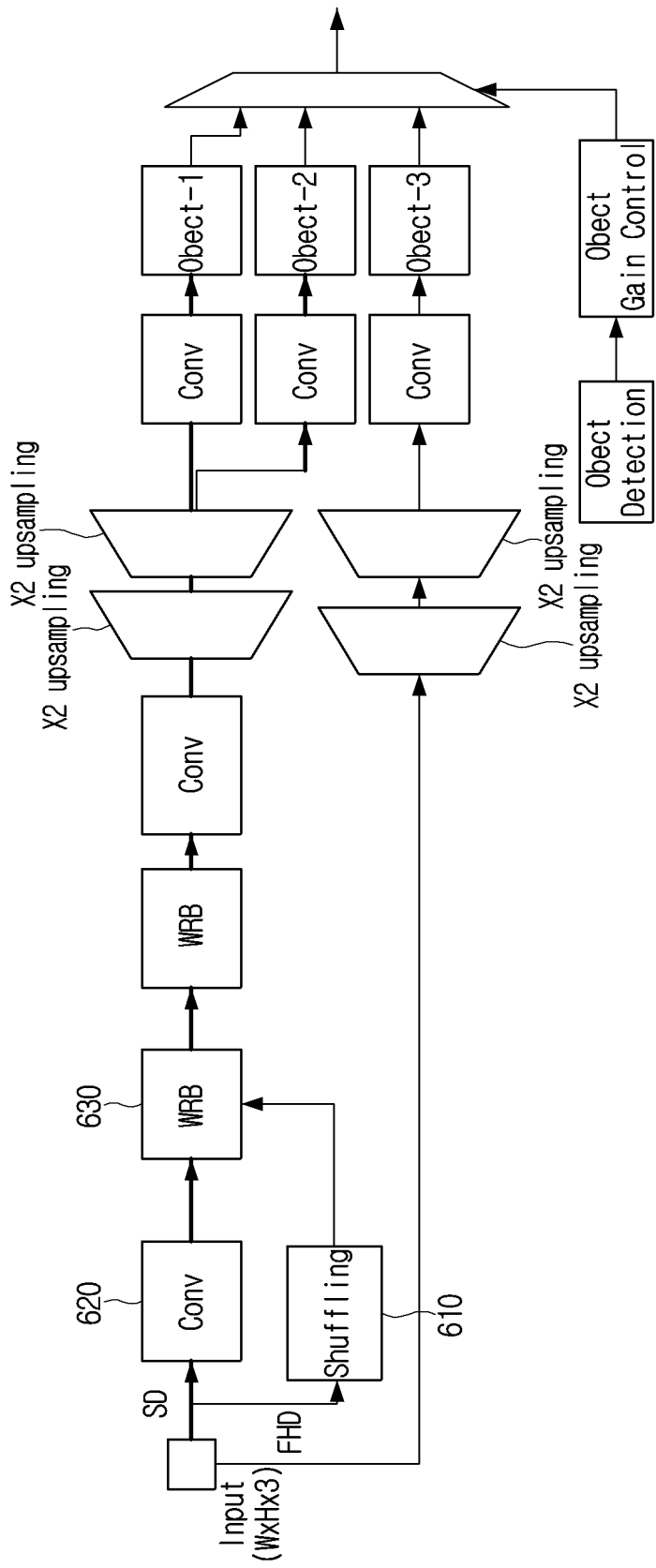

FIGS. 5 and 6 are views illustrating methods of reducing a capacity of a line memory according to various embodiments of the disclosure.

For convenience of description, it is assumed that an image of SD or FHD resolution is enlarged to an image of UHD resolution. Conventionally, a line memory of a size corresponding to a horizontal resolution was used to enlarge an image of FHD resolution in real time, and when the image of SD resolution was input, only a part of the line memory was used. However, according to the disclosure, a line memory having a size of half the horizontal resolution may be implemented.

In order to enlarge the image of SD or FHD resolution to the image of UHD resolution, a network to expand to 4 times for SD is required and a network to expand to 2 times for FHD are required.

As shown in FIG. 5, if the resolution of the input image is SD resolution, the processor 120 may input the input image to each of first models corresponding to the SD resolution among a plurality of neural network models, and if the resolution of the input image is FHD resolution, the processor 120 may sample the input image and change the input image to an image having the SD resolution, and input the changed image having the SD resolution to each of the first models.

In this case, since inputs of the models are all the same as SD resolution, weight values of the models do not vary according to the resolution.

Alternatively, as shown in FIG. 6, if the resolution of the input image is SD resolution, the processor 120 may input the input image to each of the first models corresponding to a critical resolution among the plurality of neural network models, and if the resolution of the input image is FHD resolution, the processor 120 may shuffle the input image to divide the input image into, for example, four sub-images, and input the four sub-images to each of the second models.

If the resolution of the input image is SD resolution, the processor 120 may input the input image to a convolution block 620, but if the resolution of the input image is FHD resolution, the processor 120 may input the input image to a wide activation residual block (WRB) 630 after the convolution block 620. The convolution block 620 may be implemented to input data of 3 channels R, G, and B of an input image, and the WRB block 630 may be implemented to input data of 12 channels. Here, the 12 channels are the number of channels according to the division into 3 channels of R, G, and B and 4 sub-images.

In addition, unlike the sampling method, in the case of the shuffling method, the shape of the neural network model in FIG. 6 is the same, but the weight value of the neural network model may be different when an image of SD resolution is input and when an image of FHD resolution is input. This is because when the image of FHD resolution is input, relationship between adjacent pixels is changed by shuffling into four sub-images, such that a model trained in SD resolution may not be used. In other words, when the image of FHD resolution is input, a neural network model may be trained using sample images acquired after shuffling in the same method.

In the above method, some data may be lost in the process of reducing the resolution, but compensation may be possible through fusion with a result of the independent general network path. The general network path may perform calculations using FHD-based horizontal line memory instead of lowering a computational complexity.

In addition, when the above method is used, manufacturing cost may be reduced without a need for separate implementation according to resolution.

Figure 7:
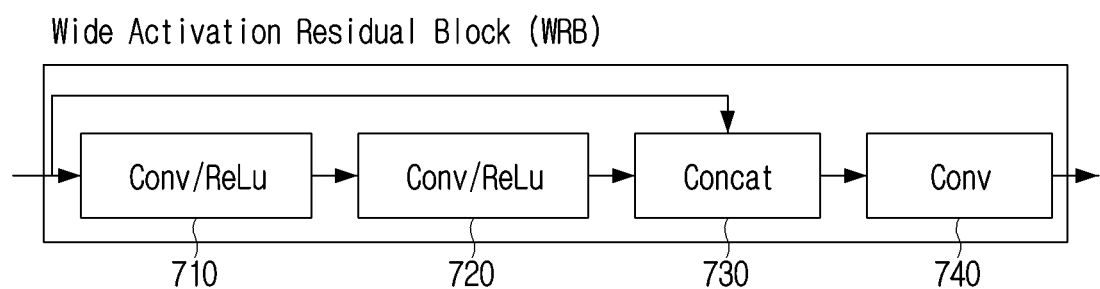
FIG. 7 is a view illustrating a WRB block according to an embodiment of the disclosure.

FIG. 7 is a view illustrating a WRB block according to an embodiment of the disclosure.

A WRB block of FIG. 7 has a structure having a wide active layer using a small number of weight values. An input is 12 channels, but a Conv/ReLu block 710 may be reduced to an output of 48 channels, a Conv/ReLu block 720 may be reduced to an output of 12 channels, a Concat block 730 may be reduced to an output of 24 channels, and a Cony block 740 may be reduced to an output of 12 channels.

The number of internal channels of the WRB block may be implemented in various ways depending on allowed resources.

Figure 8:
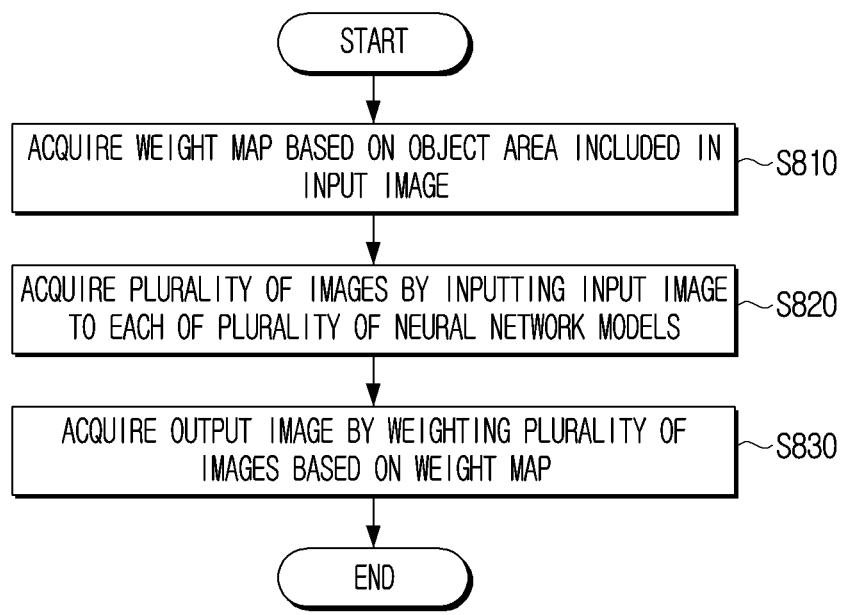
FIG. 8 is a flowchart illustrating a method of controlling an electronic apparatus according to an embodiment of the disclosure.

FIG. 8 is a flowchart illustrating a method of controlling an electronic apparatus according to an embodiment of the disclosure.

A weight map is acquired based on an object area included in an input image (S810). A plurality of images are acquired by inputting the input image to each of a plurality of neural network models (S820). An output image is acquired by weighting the plurality of images based on the weight map (S830). Here, each of the plurality of neural network models may be a model trained to upscale images.

The plurality of neural network models may include a first neural network model and a second neural network model, and an operation of acquiring the plurality of images (S820) may input the input image to the first neural network model to acquire a first image, and input the input image to the second neural network model to acquire a second image, and an operation of acquiring an output image (S830) may acquire the output image by weighting the first image and the second image based on the weight map. The first neural network model may be a model in which an upscaling process of an object area is enhanced, and the second neural network model may be a model in which the upscaling process of a background area is enhanced.

An operation of acquiring the output image (S830) may assign a higher weight to the object area included in the first image than the object area included in the second image, and may assign a lower weight to the background area included in the first image than the background area included in the second image to weight the first image and the second image.

Meanwhile, the operation of acquiring the weight map (S810) may identify an object area from the input image, and acquire a weight map in which a weight corresponding to the object area is different from a weight corresponding to the other area in the input image.

The operation of acquiring the weight map (S810) may acquire a weight map in which the weight is gradually changed based on the center of the object area.

Meanwhile, the operation of acquiring the plurality of images (S820) may input the image to each of the first models corresponding to a critical resolution among the plurality of neural network models if the resolution of the input image is a critical resolution, and preprocess the input image if the resolution of the input image is greater than the critical resolution, input the preprocessed image to each of second models among the plurality of neural network models.

The operation of inputting to each of the second models may shuffle the input image to divide the image into a plurality of sub-images and input the plurality of sub-images to each of the second models if the resolution of the input image is greater than the critical resolution, Meanwhile, the operation of acquiring the plurality of images (S820) may input the input image to each of the first models corresponding to the critical resolution among the plurality of neural network models if the resolution of the input image is the critical resolution, and if the resolution of the input image is greater than the critical resolution, may change the input image to an image having the critical resolution by sampling the input image, and input the changed image having the critical resolution to each of the first models.

In addition, the object area may include at least one of a human body area, a face area, a text area, a graphic area, an artifact area, and a natural object area.

According to various embodiments of the disclosure as described above, the electronic apparatus may improve image processing performance by using a plurality of neural network models specialized for each object type.

In addition, the plurality of neural network models may be specialized for each type of object, such that weight reduction is possible, thereby reducing the capacity of the model.

Meanwhile, the various example embodiments described above may be implemented as an S/W program including an instruction stored on machine-readable (e.g., computer-readable) storage media. The machine is an apparatus which is capable of calling a stored instruction from the storage medium and operating according to the called instruction, and may include an electronic apparatus according to the above-described example embodiments. When the instruction is executed by a processor, the processor may perform a function corresponding to the instruction directly or using other components under the control of the processor. The command may include a code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an example embodiment, the method according to the various example embodiments described above may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™). In the case of online distribution, at least a portion of the computer program product may be at least temporarily stored or temporarily generated in a server of the manufacturer, a server of the application store, or a storage medium such as memory.

In addition, according to an embodiment, various embodiments described above may be implemented in a recording media that may be read by a computer or a similar device to the computer by suing software, hardware, or a combination thereof. In some cases, the embodiments described herein may be implemented by the processor itself. In a software configuration, various embodiments described in the specification such as a procedure and a function may be implemented as separate software modules. The software modules may respectively perform one or more functions and operations described in the present specification.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device. The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, ROM, or the like.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program, or other component, according to various exemplary embodiments, may be sequential, parallel, or both, executed iteratively or heuristically, or at least some operations may be performed in a different order, omitted, or other operations may be added.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
   a memory configured to store a plurality of neural network models; and
   a processor connected to the memory and control the electronic apparatus,
   wherein the processor is configured to:
   obtain a weight map based on an object area included in an input image,
   obtain a plurality of images by inputting the input image to each of the plurality of neural network models, and
   obtain an output image by weighting the plurality of images based on the weight map,
   wherein each of the plurality of neural network models is a model trained to upscale an image, and
   wherein the processor is further configured to assign a higher value to an object area included in a first image from among the plurality of images than an object area included in a second image from among the plurality of images, and assign a lower value to a background area included in the first image than a background area included in the second image to weight the first image and the second image.

2. The apparatus of claim 1, wherein the plurality of neural network models include a first neural network model and a second neural network model,
   wherein the processor is configured to:
   obtain the first image by inputting the input image to the first neural network model,
   obtain the second image by inputting the input image to the second neural network model,
   based on the weight map, obtain the output image by weighting the first image and the second image,
   wherein the first neural network model is a model in which upscaling processing of the object area is enhanced, and
   wherein the second neural network model is a model in which upscaling processing of a background area included in the input image is enhanced.

3. The apparatus of claim 1, wherein the processor is configured to identify the object area from the input image, and obtain a map in which a weight corresponding to the object area is different from a weight corresponding to the other area included in the input image.

4. The apparatus of claim 3, wherein the processor is configured to obtain a weight map in which a weight gradually changes based on a center of the object area.

5. The apparatus of claim 1, wherein the processor is configured to, based on a resolution of the input image being a critical resolution, input the input image to each of first models corresponding to the critical resolution among the plurality of neural network models, and
   based on the resolution of the input image being higher than the critical resolution, preprocess the input image, and input the preprocessed image to each of second models among the plurality of neural network models.

6. The apparatus of claim 5, wherein the processor is configured to, based on the resolution of the input image being higher than the critical resolution, divide the input image into a plurality of sub-images by shuffling, and
   input the plurality of sub-images into each of the second models.

7. The apparatus of claim 1, wherein the processor is configured to, based on a resolution of the input image being a critical resolution, input the input image to each of first models corresponding to the critical resolution among the plurality of neural network models, and
   based on the resolution of the input image being higher than the critical resolution, change the input image to an image having the critical resolution by sampling the input image, and input the changed image having the critical resolution to each of the first models.

8. The apparatus of claim 1, wherein the object area is configured to include at least one of a human body area, a face area, a text area, a graphic area, an artifact area, and a natural object area.

9. The apparatus of claim 1, wherein the plurality of neural network models include a first neural network model and a second neural network model,
   wherein the processor is configured to:
   obtain a first image and a second image by inputting the input image to the first neural network model,
   obtain a third image by inputting the input image to the second neural network model,
   based on the weight map, obtain the output image by weighting the first image, the second image, and the third image,
   wherein the first neural network model is a model in which upscaling processing of a first type of an object area included in the input image and corresponding to the first image and upscaling processing of a second type of an object area included in the input image area corresponding to the second image are enhanced,
   wherein the second neural network model is a model in which upscaling processing of a third type of an object area included in the input image and corresponding to the third image is enhanced, and
   wherein the first type, the second type and the third type are different from each other.

10. A method of controlling an electronic apparatus, the method comprising:
    obtaining a weight map based on an object area included in an input image;
    obtaining a plurality of images by inputting the input image to each of a plurality of neural network models; and
    obtaining an output image by weighting the plurality of images based on the weight map, wherein each of the plurality of neural network models is a model trained to upscale an image, and wherein the obtaining the output image includes assigning a higher value to an object area included in a first image from among the plurality of images than an object area included in a second image from among the plurality of images, and assigning a lower value to a background area included in the first image than a background area included in the second image to weight the first image and the second image.

11. The method of claim 10, wherein the plurality of neural network models include a first neural network model and a second neural network model, wherein the obtaining the plurality of images includes obtaining the first image by inputting the input image to the first neural network model, and obtaining the second image by inputting the input image to the second neural network model, wherein the obtaining the output image includes, based on the weight map, obtaining the output image by weighting the first image and the second image, wherein the first neural network model is a model in which upscaling processing of the object area is enhanced, and wherein the second neural network model is a model in which upscaling processing of a background area included in the input image is enhanced.

12. The method of claim 10, wherein the obtaining the weight map includes identifying the object area from the input image, and obtaining a map in which a weight corresponding to the object area is different from a weight corresponding to the other area included in the input image.

13. The method of claim 12, wherein the obtaining the weight map includes obtaining a weight map in which a weight gradually changes based on a center of the object area.

14. The method of claim 10, wherein the obtaining the plurality of images includes, based on a resolution of the input image being a critical resolution, inputting the input image to each of first models corresponding to the critical resolution among the plurality of neural network models, and based on the resolution of the input image being higher than the critical resolution, preprocessing the input image, and inputting the preprocessed image to each of second models among the plurality of neural network models.

15. The method of claim 14, wherein the inputting the preprocessed image to each of the second models includes, based on the resolution of the input image being higher than the critical resolution, dividing the input image into a plurality of sub-images by shuffling, and inputting the plurality of sub-images into each of the second models.

16. The method of claim 10, wherein the obtaining the plurality of images includes, based on a resolution of the input image being a critical resolution, inputting the input image to each of first models corresponding to the critical resolution among the plurality of neural network models, and based on the resolution of the input image being higher than the critical resolution, changing the input image to an image having the critical resolution by sampling the input image, and inputting the changed image having the critical resolution to each of the first models.

17. The method of claim 10, wherein the object area is configured to include at least one of a human body area, a face area, a text area, a graphic area, an artifact area, and a natural object area.

18. A non-transitory computer-readable recording medium in which a program for executing a method of operating an electronic apparatus is stored, wherein the method comprises:

obtaining a weight map based on an object area included in an input image;

obtaining a plurality of images by inputting the input image to each of a plurality of neural network models; and obtaining an output image by weighting the plurality of images based on the weight map, wherein each of the plurality of neural network models is a model trained to upscale an image, and wherein the obtaining the output image includes assigning a higher value to an object area included in a first image from among the plurality of images than an object area included in a second image from among the plurality of images, and assigning a lower value to a background area included in the first image than a background area included in the second image to weight the first image and the second image.

* * * * *